(12) United States Patent
Kuo

(10) Patent No.: US 7,612,469 B2
(45) Date of Patent: Nov. 3, 2009

(54) DUAL-INPUT REDUNDANT POWER SUPPLY

(75) Inventor: Heng-Chen Kuo, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 156 days.

(21) Appl. No.: 11/778,663

(22) Filed: Jul. 17, 2007

(65) Prior Publication Data

US 2008/0150363 A1 Jun. 26, 2008

(30) Foreign Application Priority Data

Dec. 26, 2006 (CN) ............ 2006 1 0201416

(51) Int. Cl.
*H02J 1/00* (2006.01)
*H02J 3/00* (2006.01)
(52) U.S. Cl. .................................. 307/80; 307/64
(58) Field of Classification Search ............. 307/64–65, 307/80
See application file for complete search history.

(56) References Cited

U.S. PATENT DOCUMENTS

| 4,614,877 | A | | 9/1986 | Knesewitsch et al. |
| 5,939,799 | A | * | 8/1999 | Weinstein ............ 307/64 |
| 2005/0270720 | A1 | * | 12/2005 | Johnson ............ 361/170 |

FOREIGN PATENT DOCUMENTS

| CN | 2125202 U | 12/1992 |
| CN | 1171088 A | 1/1998 |

* cited by examiner

*Primary Examiner*—Albert W. Paladini
*Assistant Examiner*—Carlos Amaya
(74) *Attorney, Agent, or Firm*—Frank R. Niranjan

(57) ABSTRACT

A dual-input redundant power supply system includes a first AC source having a hot line and a neutral line, a second AC source having a hot line and a neutral line, a power relay, and an AC to DC converter connected to the first AC source and second AC source via the power relay. When the first AC source works normally, the power relay controls the first AC source to supply power to the AC to DC converter. When the first AC source does not work, the power relay controls the second AC source to supply power to the AC to DC converter.

4 Claims, 2 Drawing Sheets

DUAL-INPUT REDUNDANT POWER SUPPLY

BACKGROUND OF THE INVENTION

1. Field of the Invention

The present invention relates to redundant power supplies, and particularly to a dual-input redundant power supply system.

2. Description of Related Art

Referring to FIG. 1, a conventional redundant power supply system is show. The redundant power supply system includes a first alternating current (AC) source 11 and a second AC source 12. Currents from the first AC source 11 and second AC source 12 are converted to direct current (DC) via a first AC to DC converter 21 and a second AC to DC converter 22 respectively. And then the DC is supplied to electrical devices via a voltage regulating circuit 30. However, the redundant power supply system needs two AC to DC converters and a corresponding voltage regulating circuit, which occupies more spaces and increases cost.

What is desired, therefore, is to provide a dual-input redundant power supply system which can save space and cost.

SUMMARY OF THE INVENTION

An exemplary dual-input redundant power supply system includes a first AC source having a hot line and a neutral line, a second AC source having a hot line and a neutral line, a power relay, and an AC to DC converter connected to the first AC source and second AC source via the power relay. When the first AC source works normally, the power relay controls the first AC source to supply power to the AC to DC converter. When the first AC source doesn't work, the power relay controls the second AC source to supply power to the AC to DC converter.

Other advantages and novel features will become more apparent from the following detailed description when taken in conjunction with the accompanying drawings, in which:

DETAILED DESCRIPTION OF THE INVENTION

Figure 1:
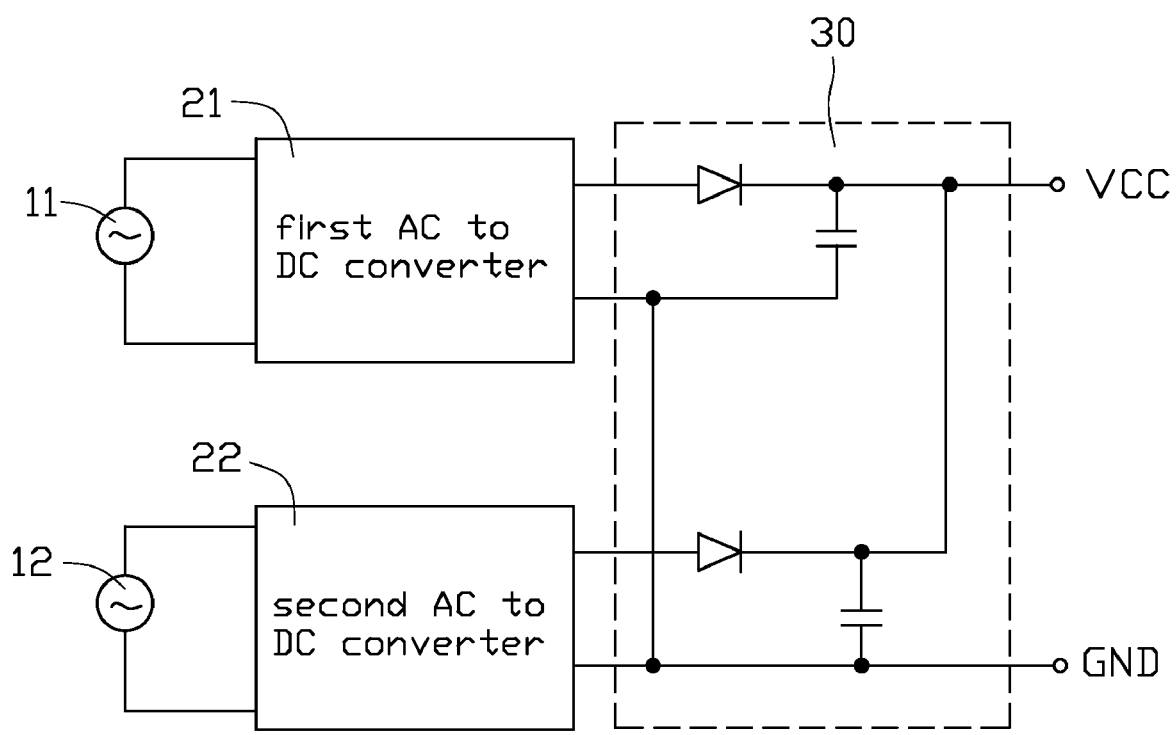
FIG. 1 is a circuit diagram of a conventional redundant power supply system.
Figure 2:
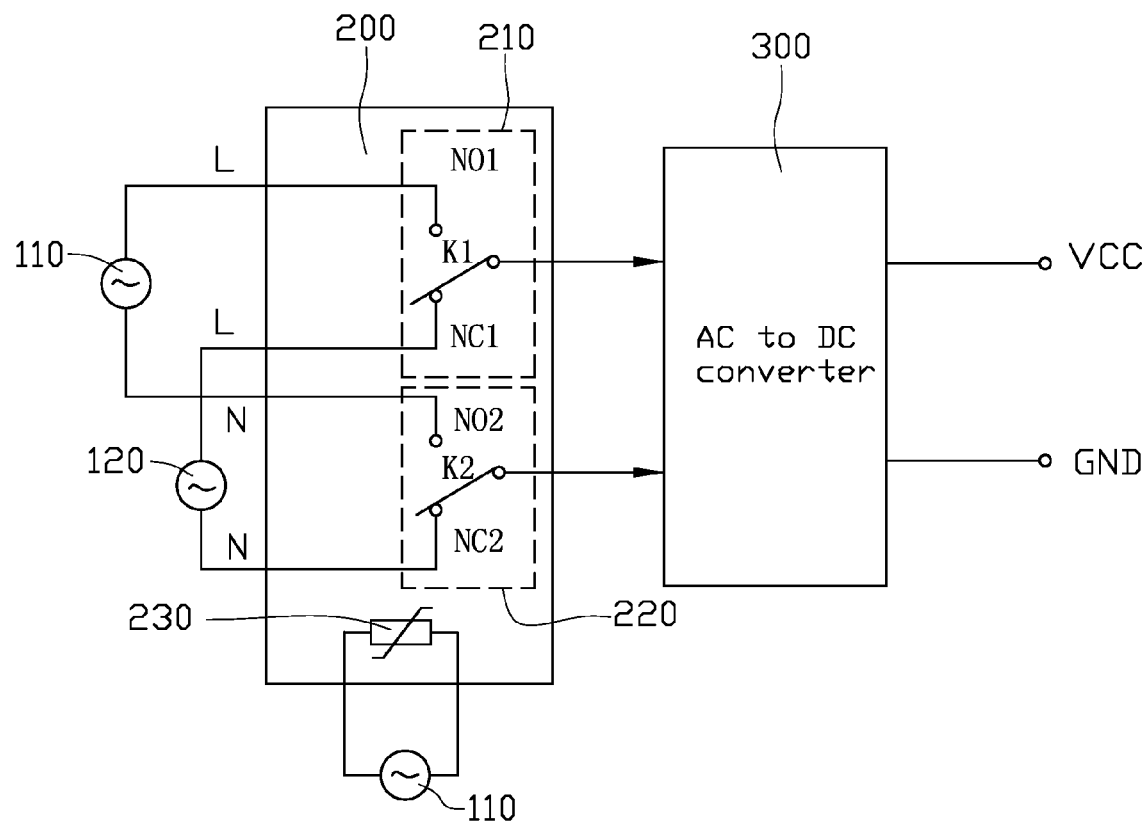
FIG. 2 is a circuit diagram of a dual-input redundant power supply system in accordance with an embodiment of the present invention.

Referring to FIG. 2, a dual-input redundant power supply system in accordance with an embodiment of the present invention includes a first alternating current (AC) source 110 having a hot line L and a neutral line N, a second AC source 120 having a hot line L and a neutral line N, a power relay 200, and an AC to direct current (DC) converter 300. The power relay 200 includes a first single-pole double-throw (SPDT) switch 210 having a normally open throw NO1, a normally closed throw NC1, and a pole K1, a second SPDT switch 220 having a normally open throw NO2, a normally closed throw NC2, and a pole K2, and an AC control coil 230 connected to the first AC source 110.

The hot line L and neutral line N of the first AC source 110 are respectively connected to the normally open throw NO1 of the first SPDT switch 210 and the normally open throw NO2 of the second SPDT switch 220. The hot line L and neutral line N of the second AC source 120 are respectively connected to the normally closed throw NC1 of the first SPDT switch 210 and the normally closed throw NC2 of the second SPDT switch 220. The pole K1 of the first SPDT switch 210 and the pole K2 of the second SPDT switch 220 are respectively connected to inputs of the AC to DC converter 300. Output of the AC to DC converter 300 is adapted for connecting to electrical devices to supply power to them.

The first SPDT switch 210 and second SPDT switch 220 are controlled by the AC control coil 230 of the power relay 200. When the first AC source 110 works normally, the AC control coil 230 is magnetized, the pole K1 of the first SPDT switch 210 is connected to the normally open throw NO1 and the pole K2 of the second SPDT switch 220 is connected to the normally open throw NO2, therefore the first AC source 110 supplies power to the electrical devices. When the first AC source 110 does not work, the AC control coil 230 is not magnetized, the pole K1 of the first SPDT switch 210 is connected to the normally closed throw NC1 and the pole K2 of the second SPDT switch 220 is connected to the normally closed throw NC2, at this time, the second AC source 120 supplies power to the electrical devices.

The dual-input redundant power supply system of the embodiment of the present invention uses the power relay 200 to switch the first AC source 110 and the second AC source 120 which can save on the number of electrical elements and space, thereby reducing costs.

It is to be understood, however, that even though numerous characteristics and advantages of the preferred embodiments have been set forth in the foregoing description, together with details of the structures and functions of the embodiments, the disclosure is illustrative only, and changes may be made in detail, especially in matters of shape, size, equivalent material and arrangement of parts within the principles of the invention to the full extent indicated by the broad general meaning of the terms in which the appended claims are expressed.

What is claimed is:

1. A dual-input redundant power supply system comprising:

a first alternating current (AC) source comprising a hot line and a neutral line;

a second AC source comprising a hot line and a neutral line;

a power relay, wherein the power relay comprises a first single-pole double-throw (SPDT) switch having a normally open throw, a normally closed throw, and a pole, a second SPDT switch having a normally open throw, a normally closed throw, and a pole, and an AC control coil, two terminals of the AC control coil are respectively connected to the hot line and the neutral line of the first AC source to be controlled and magnetized by the first AC source, the hot line and neutral line of the first AC source are respectively connected to the normally open throw of the first SPDT switch and the normally open throw of the second SPDT switch, the hot line and neutral line of the second AC source are respectively connected to the normally closed throw of the first SPDT switch and the normally closed throw of the second SPDT switch; and an AC to direct current (DC) converter connected to the first AC source and second AC source via the power relay, the poles of the first SPDT switch and second SPDT switch are respectively connected to inputs of the AC to DC converter, output of the AC to DC converter is configured for connecting to electrical devices to supply power thereto, when the first AC source works normally, the AC control coil is magnetized, the pole of the first SPDT switch is connected to the normally open throw of the first SPDT switch and the pole of the second SPDT is connected to the normally open throw of the second SPDT switch, such that the power relay controls the first AC source to supply power to the AC to DC converter, when the first AC source does not work, the AC control coil is not magnetized, the pole of the first SPDT switch is connected to the normally closed throw of the first SPDT switch and the pole of the second SPDT is connected to the normally closed throw of the second SPDT switch, such that the power relay controls the second AC source to supply power to the AC to DC converter.

2. A dual-input redundant power supply system comprising:

a first alternating current (AC) source comprising a hot line and a neutral line;

a second AC source comprising a hot line and a neutral line; and a power relay comprising a first single-pole double-throw (SPDT) switch having a normally open throw, a normally closed throw, and a pole, a second SPDT switch having a normally open throw, a normally closed throw, and a pole, and an AC control coil, wherein two terminals of the AC control coil are respectively connected to the hot line and the neutral line of the first AC source, wherein the hot line and neutral line of the first AC source are respectively connected to the normally open throw of the first SPDT switch and the normally open throw of the second SPDT switch, the hot line and neutral line of the second AC source are respectively connected to the normally closed throw of the first SPDT switch and the normally closed throw of the second SPDT switch such that when the first AC source does not work normally, the second AC source is capable of replacing the first AC source to supply power via the power relay according to the first AC source, the poles of the first SPDT switch and second SPDT switch are configured for connecting to electrical devices to supply power thereto.

3. The dual-input redundant power supply system as claimed in claim 2, further comprising an AC to DC converter, the poles of the first SPDT switch and second SPDT switch respectively connected to inputs of the AC to DC converter, output of the AC to DC converter configured for connecting to the electrical devices to supply power thereto.

4. A redundant power supply system comprising:

a first alternating current (AC) source;

a second AC source;

an AC to direct current (DC) converter configured to convert AC from one of the first and second AC sources to DC; and a power relay connected between the first and second AC sources configured to selectively connect one of the first and second AC sources to the AC to DC converter according to the first AC source;

wherein the power relay comprises a first single-pole double-throw (SPDT) switch having a normally open throw, a normally closed throw, and a pole, a second SPDT switch having a normally open throw, a normally closed throw, and a pole, and an AC control coil, two terminals of the AC control coil are respectively connected to the hot line and the neutral line of the first AC source, the first AC source comprises a hot line and a neutral line respectively connected to the normally open throw of the first SPDT switch and the normally open throw of the second SPDT switch, the second AC source comprises a hot line and a neutral line respectively connected to the normally closed throw of the first SPDT switch and the normally closed throw of the second SPDT switch, the poles of the first SPDT switch and second SPDT switch are respectively connected to inputs of the AC to DC converter, output of the AC to DC converter is configured for being connected to electrical devices to supply power thereto.

* * * * *